United States Patent Office 3,243,386
Patented Mar. 29, 1966

3,243,386
CATALYST FOR THE SYNTHESIS OF AMMONIA AND METHOD OF PRODUCING SAME
Anders Nielsen, Bagsvaerd, Denmark, and Sven Sigvard Bergh, Vargon, and Bölge Troberg, Trollhattan, Sweden, assignors to Wargons Aktiebolag, Vargon, Sweden and Haldor Frederik Axel Topsoe, Hellerup, Denmark
No Drawing. Filed July 20, 1961, Ser. No. 125,346
Claims priority, application Denmark, July 26, 1960, 2,939/60
8 Claims. (Cl. 252—455)

This invention relates to catalysts for synthetizing ammonia from hydrogen and nitrogen. Known catalysts of this kind, when in the oxide state, consist for the main part of iron oxide which is generally on an oxidation level corresponding approximately to $Fe_3O_4$, and contain small amounts of oxides which are not readily reducible, such as oxides of potassium, calcium, aluminium and other elements, the promotors, so-called. After the catalyst in the oxidic state has been charged into the converter, it must be subjected to chemical reduction by which it is converted into the active state; the catalyst in its active reduced state consists thus of iron containing the said difficultly reducible oxides. The reduction—which alternatively may be carried out in a particular reduction converter—is generally performed by means of hydrogen, ammonia synthesis gas or by means of a mixture of hydrogen, nitrogen and ammonia.

In the oxidic state of the catalyst the promoter oxides are present to a greater or smaller extent in the form of mixed oxides with the iron oxide. In the reduced, active state of the catalyst the promotor oxides are functioning in two ways viz: they reduce the rate of growth of the iron crystals and they change by their presence on the surfaces of the iron crystals the electronic state of the iron and consequently also its chemisorptive properties, for instance, against nitrogen.

In addition to the above named promoter oxides several other such oxides, for instance, beryllium oxide, magnesium oxide, lanthanium oxide, solicon oxide, thorium oxide, zeroconium oxide and cerium oxide have been used either singly or two, three or more at the same time.

The combinations that have been of the greatest importance are potassium oxide-aluminium-oxide and potassium oxide-calcium oxide-aluminium oxide. In the double promoted catalysts molybdenum oxide may enter together with aluminium oxide, but the activity is smaller than if aluminium is used solely for promoter. It has also been proposed, in certain types of triply promoted catalysts containing the combinations $K_2O$, CaO and $Al_2O_3$, to substitute BeO or MgO for CaO.

Even quadruply promoted iron catalysts have been proposed, among which is a catalyst containing the combination of the promoting constituents $K_2O$, CaO, MgO and $Al_2O_3$ (cf., United States Patent 1,771,130).

Certain combinations of promotors render the reduction of the precatalyst (i.e., the catalyst in the oxidic form) more difficult, the reduction process being retarded. In many cases, therefore, it is impractical to carry out the reduction in the converter itself; the reduction may then be performed in an apparatus devised for that purpose and in continuation of the reduction the reduced catalyst must be subjected to a stabilization treatment. The stabilization consists in a treatment by which the pre-reduced catalyst is converted into a condition in which it can be transferred to the converter without destruction, and can be readily reconverted to the active state after having been placed in the converter. Besides, the pre-reduction outside the converter presents certain advantages in itself, which advantages may compensate for the costs of stabilization and add to the value of this process where the catalyst is difficult to reduce. It has been held that the presence of beryllium oxide exerts a greatly hampering influence on the reduction rate of $Fe_3O_4$, and that the presence of magnesium oxide reduces strongly the rate of reduction of FeO.

The said catalysts in oxidic form have generally been produced by fusing the oxides and subsequently crushing and screening the fused mass to a suitable grain size. Such grains of fused material contain in the reduced active state a system of minute pores, the average diameter of which is about 100 Angstrom. Owing to the presence of said pores the inner surface is between 5 $m.^2/g.$ and 25 $m.^2/g.$ This surface, however, is available to the reactants only by way of diffusion through the said system of pores. Since the activity of any particular type of catalyst increases with the inner surface accessible to the reactants, the higher the activity is of a given catalyst, the lower is the effectivity at which its inner surface is utilized, when the catalyst is used for the synthesis of ammonia, in which it is endeavoured to use as large grains of catalyst as possible in order to decrease the pressure drop through the reactor. This is particularly important in case of the most active catalysts, where a high gas velocity through the catalyst is aimed at. If the size of the grains exceeds a certain value depending on the conditions of operation, diffusion restriction is thus assumed to play an important role in the rate of production obtainable. This value is often about 8 mm.

Accordingly it would be appropriate if, in the active, reduced condition, the catalyst in addition to the said micro pores would have a system of coarse pores adapted to serve as ways of admission to the micro pores. Such structure would also facilitate the reduction of the catalyst. It is true that a system of coarser pores can be obtained when the catalyst is produced by pressing powders of the individual constituents. In a method of this kind such pressing and subsequent sintering of a mechanical mixture of fine powders of the individual constituents is relied upon. Prior to sintering, the mixture is moistened with a solution of salts, dried and pressed to bodies of suitable form and size; these bodies are heated to 400–440° C. for pre-sintering after which final sintering is carried out at 1100–1300° C.

However, it has not been found possible, as yet, without fusing the individual constituents together, to produce catalysts possessing a satisfactory system of micro pores in the active reduced form, securing an activity and mechanical properties sufficiently stable to be of value for practical use.

It is the main object of the present ivention to provide for a method of producing a catalyst in which the drawbacks of known catalysts and methods are avoided.

A further object of the invention is the catalyst so produced.

A still further object is the novel catalyst whether or not it is produced by the method forming one object of our patent.

The word catalyst is used in its general sense, meaning the catalyst in all its forms such as its precatalytic oxidic form, its reduced active form, and its reduced, stabilized form.

In the method according to the present invention a pre-catalyst containing iron oxide and promoter components with potassium oxide, at least one oxide of a metal belonging to the 2nd group of the periodic system of elements, such as calcium, and at least one oxide of an element belonging to the 3rd group of the periodic system, such as aluminium, in amounts between 0.5 and 15 percent by weight is produced, the characteristic feature of the method being that in addition between 0.03 and 10 percent by weight of beryllium oxide are incorporated with the fused mass, the mass being cooled to solidification, crushed and milled to small particles suitable for sintering and formed to bodies having the size of 1–30 mm. by metal-ceramic methods.

The purpose of using the metal-ceramic methods known per se for producing the bodies is to secure that the bodies will possess pores of relatively considerable width, e.g., pores having a width of 50,000–5,000,000 Angstrom; since a powder produced by crushing and milling a solidified melt containing iron oxide and promoter oxides is used as primary material for making the bodies by metal-ceramic methods, the individual particles will possess, after reduction of the catalyst in the manner known per se, stable micro pores of, e.g. 20–3,000 Angstrom. Hereby the access of the synthesis gas to the interior surface of the particles is facilitated, so that the restriction of the rate of production in the synthesis of ammonia hitherto existing when using grains of the size of which exceeds the limit mentioned above is avoided. At the same time the activity of the catalyst is increased by incorporating beryllium oxide therein, the increased activity being effectively utilizable at equal grain sizes in consequence of the double system of pores.

Thus it has been found that by replacing a small part of the calcium oxide of a usual triply promoted catalyst of high activity by beryllium oxide, a considerable increase in the activity of this catalyst can be obtained. Thus it was found possible in a series of activity determinations, in which the percentage of ammonia at the outlet of the reactor was measured to 27–28, when using the said triply promoted catalyst, to increase the percentage of ammonia at the outlet to 30 when using a catalyst which in addition to potassium oxide, calcium oxide and aluminium oxide contained also beryllium oxide. Under the reaction conditions prevailing in this series of experiments the percentage of ammonia corresponding to thermodynamic equilibrium was 38.

It has further been found that catalysts produced in accordance with the present invention are advantageously reduced in a separate reduction converter, it being possible to stabilize said catalysts effectively by weak oxidation by which after the reduction between 1 percent and 20 percent of the oxygen removed by the reduction is reabsorbed.

Catalysts in the oxidic state produced in the manner described, reduced catalysts as used in the process of production of ammonia and pre-reduced catalysts stabilized as mentioned above are also objects of the present invention. The invention also comprises the production of ammonia by a synthesis applying the catalysts of the invention or produced by the method of the invention.

In the reduced catalysts the percentage of beryllium oxide and other promoter oxide for obvious reasons is greater than the percentages in the oxidic state and amount to .04 to 14 percent and 0.7 to 20 percent respectively.

In the following, the invention is further explained by means of examples describing laboratory experiments comparing materials of identical composition, of which one is formed directly by crushing a fused mass whereas the other material is formed by the method of the present invention, the bodies produced by metal-ceramic methods having been crushed to the same range of sizes as in the first experiment. The presence of coarse pores in the latter material is shown by determination of density and by microscopy and at the same time it is shown that the rate of production on a laboratory scale is identical, i.e., that milling, forming and metal-ceramic treatment has not changed the catalytic properties of the material. The increase in rate of production due to the coarse pores can not be shown in laboratory experiments because the dimensions of laboratory equipments does not allow use of grains in a large enough size for this effect to show up.

*Example 1*

A catalyst was prepared by producing a fused mixture of oxides containing as its main constituent iron oxide corresponding in its composition approximately to $Fe_3O_4$ and further as promoter components .65% $K_2O$, 2.9% CaO, 3.3% $Al_2O_3$, .06% BeO and 1.2% $SiO_2$. The molten mass was cooled to solification and crushed and a fraction comprising the range of sizes from 1.2 to 2.5 mm. was used for the experiment.

After reduction in a laboratory converter this catalyst yielded at 329 kg./cm.$^2$, the average temperature 450° C. and a gas velocity of 16,100 volume gas per volume catalyst per hour, a rate of production of ammonia of 1.16 g. ammonia per g. catalyst per hour.

*Example 2*

Another catalyst was produced by finely milling the solidified melt from the preparation of Example 1 and forming the powder thereby obtained to cylinders of 8.9 mm. diameter and 9.5 mm. height by the following method: From the finely milled powder one third passing a 20 mesh sieve and two thirds passing a 100 mesh sieve were thoroughly mixed. From the mixed powder tablets of the above named dimensions were pressed using a force of 4.2 metric tons per tablet. The pressed tablets, the mechanical strength of which was slight, were treated for 2 hours with nitrogen at 90° C. and then sintered at 1120–1130° C. for 2 hours. The sintered tablets were cooled down in nitrogen to room temperature during 1 hour. Thereby strong cylindrical tablets were obtained, the radial crushing strength of which was 116 kg. per tablet, and the average axial crushing strength of which was 500 kg. per tablet. The density of the tablets was 4.21 g./cm.$^3$ as compared with the density of about 4.85 g./cm.$^3$ of the solidified fused mass. The decrease in density is due to the coarse pores, the micro pores being formed only on subsequent reduction.

The tablets were crushed and a fraction within the range of 1.2–2.5 mm. was isolated. After reduction in a laboratory converter, a production rate of 1.15 g. ammonia per g. catalyst per hour was obtained at a pressure of 331 kg./cm.$^2$, an average temperature of 450° C. and a gas velocity of 15,600 volume gas per volume catalyst per hour.

A sample of the catalyst, after it had been used in the synthesis of ammonia as above described, and for a while had worked at 517° C., possessed a surface of 18.1 m.$^2$ per g. of the reduced catalyst, measured according to the B.E.T. method.

Microscopical analysis of ground and polished specimens of the sintered and cooled cylinders showed coarse pores the width of which were within the range 100,000 Angstrom to 5,000,000 Angstrom.

We claim:

1. A pre-catalyst for use in the synthesis of ammonia consisting of compressed sintered bodies having a size range of 1.2 to 2.5 mm. said bodies containing iron oxide at an oxidation level approximately that of $Fe_3O_4$ as the major ingredient by weight together with promoter components of approximately 0.65% $K_2O$, 2.9% CaO, 3.3% $Al_2O_3$, 0.06% BeO and 1.2% $SiO_2$ by weight.

2. A catalyst for use in the synthesis of ammonia consisting of the pre-catalyst of claim 1 in active reduced state in which the iron is metallic and in the condition of sintered crystalline particles.

3. A method of producing a pre-catalyst which is in the oxidic state and from which a catalyst for use in the production of ammonia can be produced by reduction and which comprises bodies, the main ingredients of which by weight are iron oxide at an oxidation level approximately that of $Fe_3O_4$ together with from 0.03 to 10% by weight, based on the weight of pre-catalyst, of beryllium oxide and together with from 0.5 to 15% by weight, based on the weight of the pre-catalyst of other promoter oxides consisting essentially of potassium oxide and oxides of at least one metal of the class consisting of calcium and magnesium, and aluminium oxide, the method comprising fusing together the iron oxide, the beryllium oxide, and the other promoter oxides, solidifying the resultant fused mass by cooling, comminuting the mass to powder, pressing the powder into bodies of desired shape of a size from 1–30 mm. and sintering the bodies.

4. Method according to claim 3 in which the pre-catalyst is reduced to active state and the reduced catalyst is subjected to weak oxidation until from 1 to 20% of the oxygen removed by the reduction has been reabsorbed.

5. Method according to claim 3 in which the pulverized material is pressed to the shape of well-defined geometrical bodies.

6. A pre-catalyst, in oxidic state, from which a catalyst for use in the production of ammonia may be produced by reduction, consisting of bodies having a size of from 1 to 30 mm. and containing macropores from 0.005 to 0.5 mm. in width, each body consisting of particles of a fused and comminuted mass consisting of iron oxide at an oxidation level of approximately $Fe_3O_4$ as a major component and 0.03–10% by weight, based on the weight of pre-catalyst, of beryllium oxide and 0.5–15% by weight based on the weight of pre-catalyst of other promoter oxides consisting essentially of potassium oxide and oxides of at least one metal of the class consisting of calcium and magnesium, and aluminum oxide.

7. A catalyst in the active reduced state for use in the production of ammonia, consisting of bodies having a size of from 1–30 mm., said bodies containing micropores within the range of 20 to 3,000 Angstrom and macropores within the range of width of 0.5 to 0.005 mm. and consisting of iron as a major component and 0.04–15% weight, based on the weight of pre-catalyst, of beryllium oxide and 0.7 to 20% based on the weight of pre-catalyst of other promoter oxides consisting essentially of potassium oxide and oxides of at least one metal of the class consisting of calcium and magnesium, and aluminum oxide.

8. The catalyst of claim 7 modified further by containing oxygen combined with the iron, the amount of oxygen so combined being within the range of 1–20% of the amount necessary to oxidize the iron contained therein to the level of $Fe_3O_4$, said catalyst being in a state of reduced activity.

References Cited by the Examiner
UNITED STATES PATENTS

| | | | |
|---|---|---|---|
| 2,414,585 | 1/1947 | Eggertsen et al. | 252—474 X |
| 2,469,755 | 5/1949 | Voorhies | 252—474 X |
| 2,583,254 | 1/1952 | Clark | 252—466 X |
| 2,584,756 | 2/1952 | Stine | 252—466 X |
| 2,778,805 | 1/1957 | McGrath | 252—474 |
| 2,919,176 | 12/1959 | Gross | 23—198 |
| 2,921,035 | 1/1960 | Houdry | 252—475 |

OSCAR R. VERTIZ, *Primary Examiner.*

JOSEPH R. LIBERMAN, MAURICE A. BRINDISI, *Examiners.*

N. DAVIS, E. J. MEROS, *Assistant Examiners.*